(12) United States Patent
Liu et al.

(10) Patent No.: US 11,093,357 B2
(45) Date of Patent: Aug. 17, 2021

(54) METHOD FOR MANAGING DISKS, ELECTRONIC DEVICE AND COMPUTER PROGRAM PRODUCT

(71) Applicant: EMC IP Holding Company LLC, Hopkinton, MA (US)

(72) Inventors: Qingyun Liu, Beijing (CN); Lei Sun, Beijing (CN); Jibing Dong, Beijing (CN); Hongpo Gao, Beijing (CN); Zhihui Qiu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/876,452

(22) Filed: May 18, 2020

(65) Prior Publication Data

US 2021/0133062 A1    May 6, 2021

(30) Foreign Application Priority Data

Oct. 30, 2019   (CN) .......................... 201911046745.0

(51) Int. Cl.
*G06F 11/00*    (2006.01)
*G06F 11/20*    (2006.01)

(52) U.S. Cl.
CPC ...... *G06F 11/2094* (2013.01); *G06F 2201/82* (2013.01)

(58) Field of Classification Search
CPC .......... G06F 3/06; G06F 3/0629; G06F 3/067; G06F 3/0683–0689; G06F 11/1612; G06F 11/2053; G06F 11/2094
See application file for complete search history.

(56) References Cited

U.S. PATENT DOCUMENTS

| | | | |
|---|---|---|---|
| 9,792,056 B1* | 10/2017 | Gao | G06F 3/0632 |
| 2006/0218344 A1* | 9/2006 | Yoshida | G06F 11/0745 711/114 |
| 2007/0101187 A1* | 5/2007 | Daikokuya | G06F 11/1076 714/6.22 |
| 2008/0172571 A1* | 7/2008 | Andrews | G06F 11/1092 714/6.12 |
| 2009/0177918 A1* | 7/2009 | Abali | G06F 11/1092 714/6.32 |
| 2017/0371546 A1* | 12/2017 | Rivera | G06F 3/0604 |
| 2019/0324875 A1* | 10/2019 | Gong | G06F 11/2094 |

\* cited by examiner

*Primary Examiner* — Michael Maskulinski
(74) *Attorney, Agent, or Firm* — BainwoodHuang

(57) ABSTRACT

Techniques involve: in accordance with a determination that a target disk in a set of disks is to be replaced, determining whether the target disk is a user disk for storing user data; in response to the target disk being the user disk, searching for a spare disk in the set of disks available for replacing the target disk; and in accordance with a determination whether the set of disks include a spare disk available for replacing the target disk, generating an indication of whether or not to provide a warning of replacing the target disk. Such techniques may more accurately provide warning of disk replacement.

17 Claims, 3 Drawing Sheets

METHOD FOR MANAGING DISKS, ELECTRONIC DEVICE AND COMPUTER PROGRAM PRODUCT

CROSS-REFERENCE TO RELATED APPLICATION

This application claims priority to Chinese Patent Application No. CN201911046745.0, on file at the China National Intellectual Property Administration (CNIPA), having a filing date of Oct. 30, 2019, and having "METHOD FOR MANAGING DISKS, ELECTRONIC DEVICE AND COMPUTER PROGRAM PRODUCT" as a title, the contents and teachings of which are herein incorporated by reference in their entirety.

FIELD

Embodiments of the present disclosure generally relate to the computer field, and more specifically, to a method for managing disks, an electronic device and a computer program product.

BACKGROUND

In a storage system based on Redundant Array of Independent Disks (RAID), if a storage disk fails or its service life is due, the storage system usually notifies a management staff to replace the storage disk. In the traditional Redundant Array of Independent Disks (RAID), the storage system typically provides a warning of replacing a storage disk based on that the storage disk is marked as failed. However, as the RADI technology advances, reserved space in the storage system based on mapped RAID may be distributed over a plurality of existing storage disks, rather than in a single hot spare disk like the traditional RAID. Therefore, the method for warning the disk replacement based on the traditional RAID is not suitable for the mapped RAID.

SUMMARY

Embodiments of the present disclosure provide a solution for managing disks.

In accordance with a first aspect of the present disclosure, there is provided a method for managing disks. The method includes: in accordance with a determination that a target disk in a set of disks is to be replaced, determining whether the target disk is a user disk for storing user data; in response to the target disk being the user disk, searching for a spare disk in the set of disks available for replacing the target disk; and in accordance with a determination whether the set of disks include a spare disk available for replacing the target disk, generating an indication of whether or not to provide a warning of replacing the target disk.

In accordance with a second aspect of the present disclosure, there is provided an electronic device. The device includes: at least one processing unit; at least one memory coupled to the at least one processing unit and stored with instructions executed by the at least one processing unit, wherein the instructions, when executed by the at least one processing unit, cause the device to perform acts including: in accordance with a determination that a target disk in a set of disks is to be replaced, determining whether the target disk is a user disk for storing user data; in response to the target disk being the user disk, searching for a spare disk in the set of disks available for replacing the target disk; and in accordance with a determination whether the set of disks include a spare disk available for replacing the target disk, generating an indication of whether or not to provide a warning of replacing the target disk.

In accordance with a third aspect of the present disclosure, there is provided a computer program product stored in a non-transitory computer storage medium and including machine-executable instructions which, when executed by a device, cause the device to perform an action according to any steps of method in the first aspect.

The Summary of the invention is provided to introduce a selection of concepts in a simplified form, which are further described in the Detailed Description. The Summary is neither intended to identify key features or essential features of the present disclosure nor to limit the scope of the present invention.

BRIEF DESCRIPTION OF THE DRAWINGS

This Summary is provided to introduce a selection of concepts in a simplified form that are further described below in the Detailed Description. This Summary is not intended to identify key features or essential features of the present disclosure, nor is it intended to be used to limit the scope of the present disclosure.

DETAILED DESCRIPTION OF EMBODIMENTS

Figure 1:
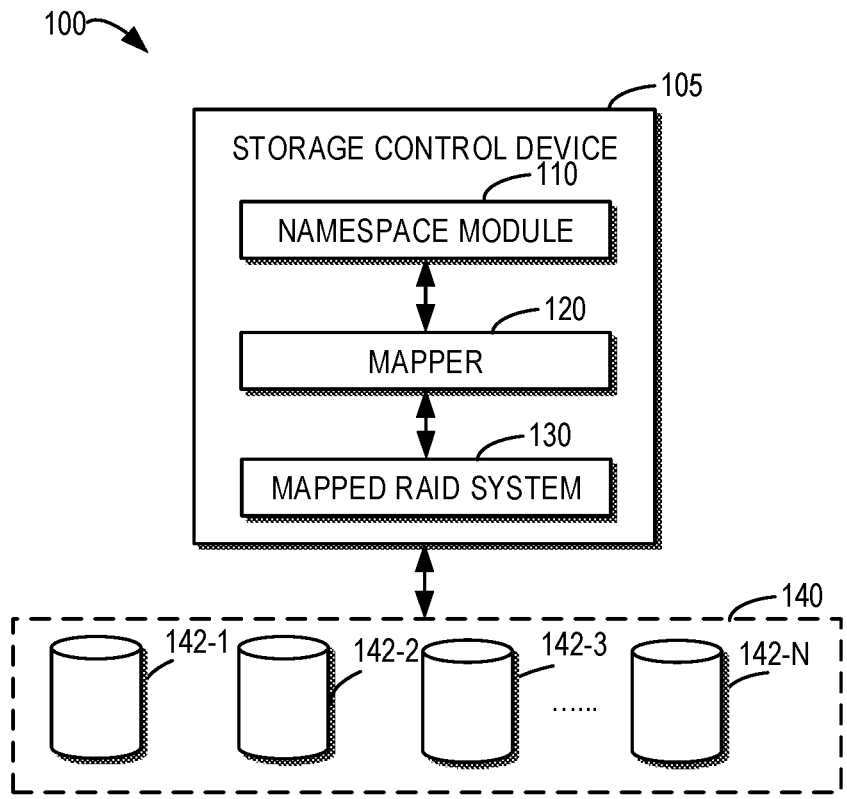
FIG. 1 illustrates a schematic diagram of an example storage system where embodiments of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described as follows in greater detail with reference to the drawings. Although preferred embodiments of the present disclosure are illustrated in the drawings, it is to be understood that the present disclosure described herein may be implemented in various manners, not limited to the embodiments illustrated herein. Rather, these embodiments are provided to make the present disclosure described herein clearer and more complete and convey the scope of the present disclosure described herein completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one other implementation." Terms "a first", "a second" and others may denote different or identical objects. The following text may also contain other explicit or implicit definitions.

In a storage system based on traditional RAID, typically a hot spare disk is included to avoid failure of storage disks in the storage system. Accordingly, in the storage system based on traditional RAID, providing an indication of replacing a storage disk to users is often triggered by marking a certain storage disk as failed. For example, when a certain storage disk is possible to fail and go offline, the storage system at this point may directly trigger a warning of replacing the storage disk. In addition, when available time of a certain storage disk is due soon (i.e., the life of the storage disk is coming to an end), the storage system may copy data of the storage disk using the hot spare disk to swap the storage disk out of the RAID, i.e., marking the storage disk as failed. At this moment, the storage system also may generate a warning of replacing the storage disk in response to marking storage disk as failed. However, this method of providing a warning of replacing the storage disk is not suitable for the storage systems based on mapped RAID.

In accordance with embodiments of the present disclosure, there is provided a solution of managing disks. In this solution, in accordance with a determination that a target disk in a set of disks is to be replaced, it is determined whether the target disk is a user disk for storing user data. When the target disk is determined as the user disk, a spare disk available for replacing the target disk is searched for in the set of disks. Moreover, in accordance with determining whether the group of disks includes a spare disk available for replacing the target disk, an indication of whether or not to provide a warning of replacing the target disk is generated. In this way, embodiments of the present disclosure may determine whether or not to generate an indication of replacing the target disk according to a type of the disk to be replaced and absence or presence of the spare disks, such that unnecessary warnings are not to be provided and the required warning is to be provided to the users.

The storage system based on mapped RAID is described below with reference to FIGS. 1 to 2. In some embodiments of the present disclosure, "disk" is also known as "storage disk." FIG. 1 is a diagram illustrating an example storage system 100 in which embodiments in the present disclosure may be implemented. As shown in FIG. 1, the storage system 100 includes a hardware storage pool 140, which includes a plurality of storage disks 142-1, 142-2, 142-3, . . . , 142-N (N is an integer greater than or equal to 1) for providing physical storage space for the storage system 100. For ease of discussion, these storage disks are sometimes collectively referred to or individually referred to as a storage disk 142. The storage disk 142 may include various types of devices with storage functions, including but not limited to a hard disk (HDD), a solid state disk (SSD), a removable disk, a compact disk (CD), a laser disk, an optical disk, and a digital video disk (DVD), floppy, blue-ray Disc, serial attached small computer system interface (SCSI) storage disk (SAS), serial advanced technology attachment (SATA) storage disk, any other magnetic storage device, and any other optical storage equipment, or any combination thereof.

As shown in FIG. 1, the storage system 100 also includes a storage control device 105 for controlling and managing the hardware storage pool 140. A namespace module 110, a mapper 120 and a mapped RAID system 130 may run on the storage control device 105. The mapped RAID system 130 in the storage system 100 is built based on a plurality of storage disks 142, which organizes the physical storage space of the storage disks 142 using a RAID algorithm. The mapped RAID system 130 provides a flat physical address space to a mapper 120 of storage system 100. The mapper 120 is configured to manage a mapping between physical addresses and logical addresses of the storage system 100. The mapper 120 provides a flat linear logical address space to a namespace module 110. The namespace module 110 utilizes the logical address space provided by the mapper and can invoke an application program interface (API) of the mapper 120 to obtain a mapping from the logical address to the physical address. When an I/O operation is performed on the storage system 100, an I/O request from the user is received by the namespace module 110 and sent to the mapper 120. The mapper 120 looks up the physical address (address where data is to be written or address where data is to be read) of data to which the I/O request is directed and sends the I/O to the mapped RAID system 130 for actual I/O operations by the mapped RAID system 130 in the backend storage disk.

It should be understood that FIG. 1 only schematically illustrates elements, modules or components in storage system 100 that are related to embodiments of the present disclosure. The various components shown in FIG. 1 are merely example storage system management architecture. In other RAID-based storage systems, there may be other architectural partitioning schemes, and other units, modules or components and the like for other functions. Thus, embodiments of the present disclosure are not limited to the specific devices, units, modules or components described in FIG. 1, but are generally applicable to any RAID technology based storage system.

Figure 2:
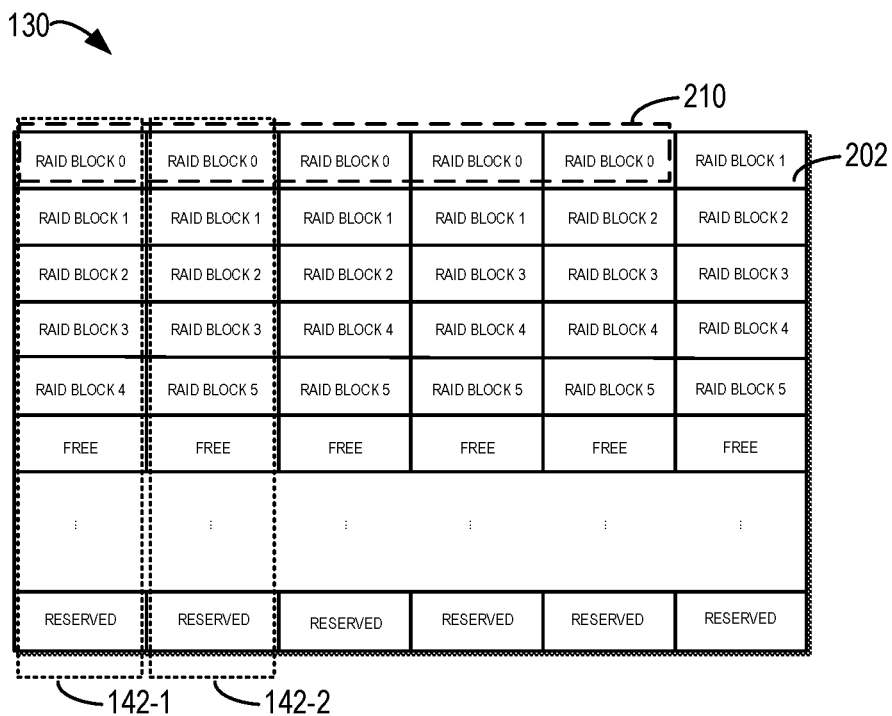
FIG. 2 illustrates a schematic diagram of the RAID composed of a plurality of storage blocks from a plurality of disks in accordance with embodiments of the present disclosure.

For a better understanding of the storage system based on mapped RAID, FIG. 2 shows an example structure of a RAID system 130. As shown in FIG. 2, the storage disk 142 is divided into a plurality of storage blocks 202, which are also referred to as a plurality of disk extents or a plurality of disk slices 202. Such division can be a logical division. The size of a storage block 202 depends on the size of the storage disk and partitioning scheme. In some examples, the size of the storage block 202 can be at a magnitude of a gigabyte. Of course, other sizes are also possible depending on the actual deployment needs.

The mapped RAID system 130 is constructed in units of storage block 202. In some dynamically allocated storage systems, when the mapped RAID system 130 is initially created, all extents are free. When the capacity of the RAID is found to be insufficient with the writing of data, the mapped RAID system 130 will select a plurality of storage blocks 202 from different storage disks 142 with a certain algorithm and organize the storage block 202 into RAID blocks 210 of the RAID system 130. Such a RAID block 210 can be considered a small RAID because the I/O access and management of the RAID block 210 is similar to a conventional RAID.

The storage block 202 may be selected from a plurality of storage disks 142 through any suitable algorithms, such as a Round-Robin algorithm, a weighted Round-Robin algorithm, and the like. The number of disk extents included in each RAID 210 depends on the type of RAID, which would provide data redundancy and resiliency of different levels. The types of RAID include RAID 2, RAID 3, RAID 4, RAID 5, RAID 6, RAID 7, and RAID 10 and so on. In FIG. 2 and below, for the purpose of illustration, embodiments of the present disclosure are discussed taking the RAID 5 type as an example. However, it should be understood that example embodiments of the present disclosure may be similarly applied to any other types of RAIDs.

In FIG. 2, each RAID block 210 includes five disk extents from different storage disks 142 depending on the type of RAID 5. As mentioned above, new RAID blocks 210 can be continuously allocated according to the needs of data writing, so that the capacity of the RAID system 130 is dynamically increased. Five RAID blocks 210 (i.e., RAID block 0 to RAID block 5) that have been allocated are shown in FIG. 2. In each storage block 202 in FIG. 2, "RAID Block 0", "RAID Block 1", "RAID Block 2", "RAID Block 3", "RAID Block 4", or "RAID Block 5" are used to mark that the disk extent is allocated to corresponding RAID blocks. The storage block 202 of each of the storage disks 142 not being selected as a RAID block is considered to be the spare storage block 202 and is marked as "spare".

In some embodiments, one or more storage block 202 (marked as "reserved") in each storage disk 142 may also be reserved for data reconstruction in the event of a disk failure. For example, if a storage disk 142 fails, the storage blocks 202 of the storage disk 142 are all marked as failed, which means that the RAID blocks 210 constructed based on these storage blocks 202 are also affected. The storage system 100 can initiate a rebuild process, replace the disk extent marked as failed in the RAID block 210 with reserved storage block 202, and reconstruct, in the reserved storage block 202, the data/information in the disk extent marked as failed. According to the reconstruction algorithm, the reconstruction process may be initiated for a period of time after the disk failure. Embodiments of the present disclosure are not limited in this regard.

In the storage system 100 based on mapped RAID, it is possible that each storage disk contains reserved storage blocks 202. Accordingly, when the available time of one storage disk is due soon, the storage control device 105 may copy the data in the due storage disk using available space in other storage disks. However, when the hardware storage pool 140 fails to include free storage disks 142, the storage control device 105 will not swap the due storage disks out of the mapped storage system 130. Correspondingly, the due storage disk is not marked as failed as well. At this moment, the storage control device 105 cannot provide a warning of replacing the due storage disks and this is unexpected. Besides, in case of the failure of a certain storage disk, if the storage control device 105 can obtain a free disk for swapping the failed disk out of the mapped RAID system 130, the failed disk is not replaced immediately as the mapped RAID system 130 still has redundancy at this point. However, in traditional solutions, the storage system always provides the warning of replacing the failed disk, which increases on the burden of the management team.

Figure 3:
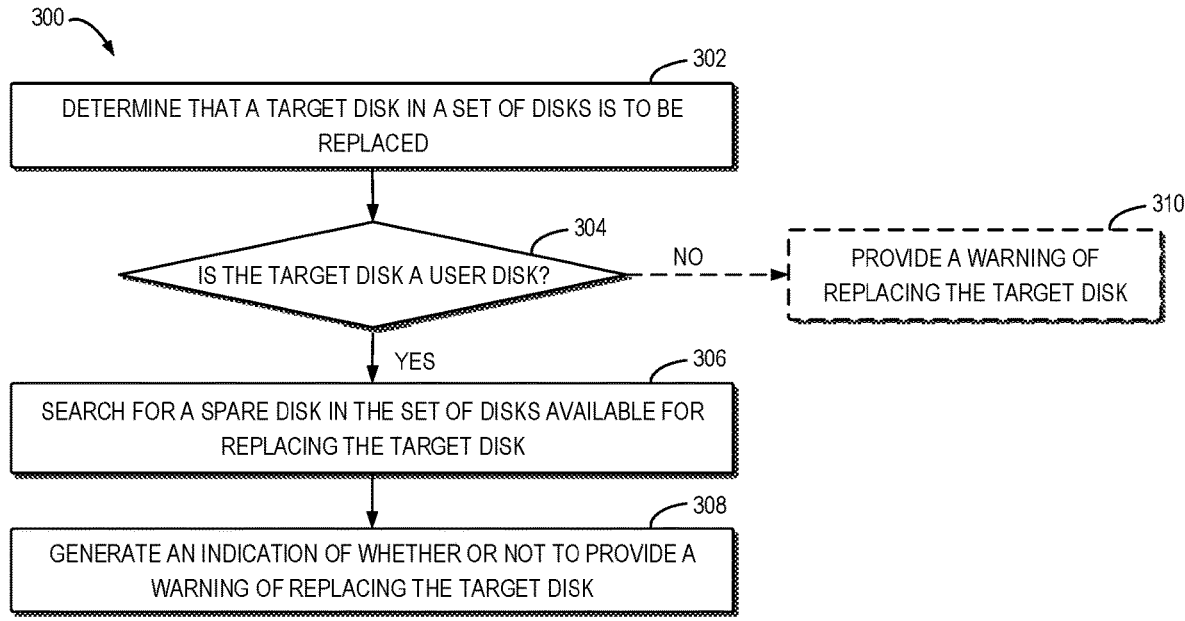
FIG. 3 illustrates a flowchart of a process of managing disks in accordance with some embodiments of the present disclosure.

A process of managing disks in accordance with embodiments of the present disclosure is described below with reference to FIGS. 3 and 4. FIG. 3 illustrates a flowchart of a process 300 of managing disks in accordance with some embodiments of the present disclosure. The process 300 is described below with reference to FIGS. 1 to 2 and may be implemented for example by the storage control device 105 of FIG. 1.

As shown in FIG. 3, at 302, the storage control device 105 determines that a target disk in a set of disks is to be replaced. In some embodiments, based on whether a disk in the set of disks is marked as failed or whether a disk having available time smaller than a predetermined threshold is determined in the set of disks, the storage control device 105 may determine that the disk in the set of disks is to be replaced. Taking FIG. 1 as an example, the storage control device 105 may determine whether a plurality of storage disks 140 in the hardware storage pool 140 (also referred to as a set of disks 140) includes a storage disk to be replaced.

Specifically, when determining a target disk marked as failed in the set of disks 140, the storage control device 105 may determine that the target disk is to be replaced and rebuild data of the failed target disk in the available space of the group of disks based on the data rebuild rule of the RAID system.

Additionally, when determining a target disk with available time smaller than a predetermined threshold in the set of disks 140, the storage control device 105 may determine that the target disk is to be replaced and copy the data of the target disk to available space in the group of disks 140.

At 304, the storage control device 105 determines whether the target disk is a user disk for storing user data. Taking FIG. 1 as the example, the storage control device 105 for example may determine that the storage disk 142-1 in the set of disks 140 is to be replaced. The storage control device 105 may further determine the type of the storage disk 142-1. In some embodiments, the storage disk 142 may include a user disk for storing user data and a system disk for storing configuration data. The system disk, for example, may store the configuration information like RAID structure and file system information etc.

In response to determining that the target disk is the user disk at 304, the procedure 300 proceeds to 306, at which the storage control device 105 searches for a spare disk available for replacing the target disk from the set of disks. In some embodiments, the storage control device 105 may determine whether the set of disks 140 includes available free disks and determines the free disk (if present) as the spare disk for replacing the target disk.

In some embodiments, the storage control device 105 also may determine whether a free disk can act as the spare disk based on its healthy state. A process of 304 is described below with reference to FIG. 4, which illustrates a flowchart of a process of searching for spare disks in accordance with embodiments of the present disclosure.

Figure 4:
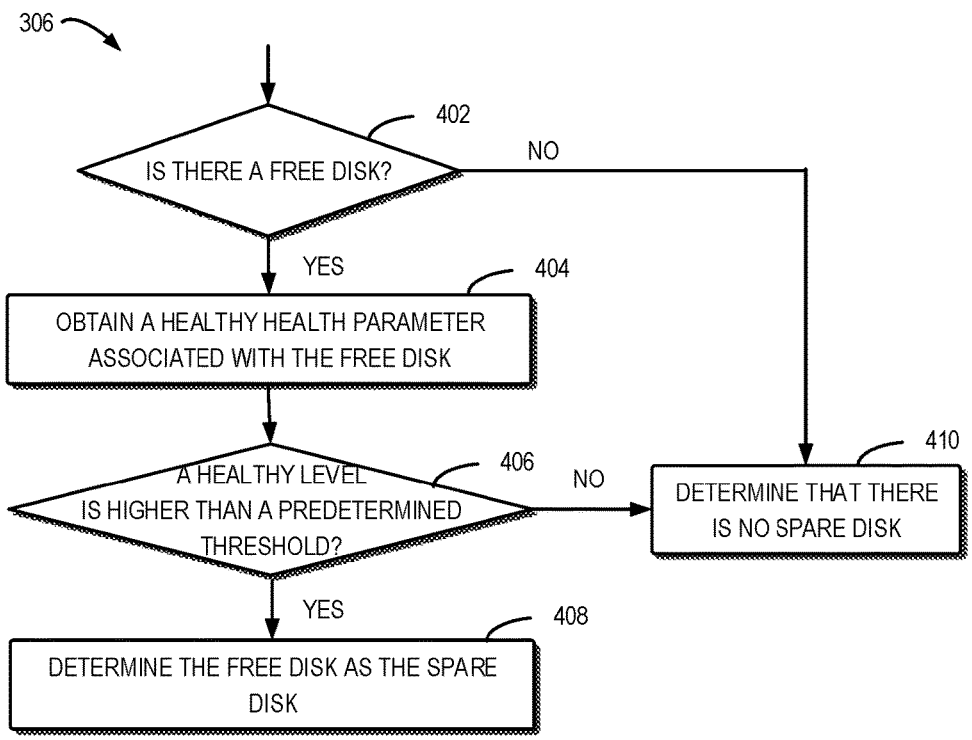
FIG. 4 illustrates a flowchart of a process of searching for spare disks in accordance with embodiments of the present disclosure.

As shown in FIG. 4, the storage control device 105 may determine whether the set of disks 130 includes free disks at \402. In response to determining absence of free disks in the set of disks, the process proceeds to 410, at which the storage control device 105 may determine that the set of disks excludes spare disks. For example, when determining that each storage disk 142 in the set of disks 140 has been used, the storage control device 105 may determine that the set of disks excludes spare disks.

On the contrary, in response to determining presence of free disks in the set of disks at 402, the process proceeds to 404, at which the storage control device 105 may obtain a healthy parameter associated with free disks. Taking FIG. 1 as the example, upon determining the storage disk 142-N in the set of disks 140 as a free disk, the storage control device 105 may further obtain a healthy parameter(s) associated with the storage disk 142-N. In some embodiments, the healthy parameters, for example, may include marking the storage disk 142-N as failed or not and a length of its available time etc.

At 406, the storage control device 105 may determine that the healthy parameters indicate that a healthy level of the free disk is higher than a predetermined threshold. In response to determining that the healthy level is higher than a predetermined threshold at 406, the process proceeds to 408, at which the storage control device 105 may determine the free disk as the spare disk. Continuing to refer to FIG. 1 as the example, the storage control device 105 for example may determine the free storage disk 142-N as the spare disk when it is not marked as failed. As a further example, the storage control device 105 also may compare the available time of the free storage disk 142-N with the predetermined threshold and only determine the free storage disk 142-N as the spare disk when its available time is greater than the threshold. It should be appreciated that any other factors for evaluating the healthy state of the storage disk may also be adopted and the present disclosure is not limited in this regard.

On the contrary, if it is determined at 406 that the healthy level is lower than or equal to the threshold, the process proceeds to 410, at which the storage control device 105 may determine that the set of disks excludes spare disks. For example, when it is determined that the free storage disk 142-N is marked as failed or has available time smaller than the threshold, the storage control device 105 may determine that the set of disks 140 excludes the spare disks.

Continuing to refer to FIG. 3, at 308, in accordance with a determination whether the set of disks includes a spare disk for replacing the target disk, the storage control device 105 may generate an indication of whether or not to provide a warning of replacing the target disk.

To be specific, in response to determining the presence of spare disks in the set of disks, the storage control device 105 may generate an indication of whether or not to provide a warning of replacing the target disk. In this way, when a storage disk fails in the set of disks 140, the storage control device 105 may replace the storage disk using a spare disk and swap the failed storage disk out of the mapped RAID system 130. Considering that the mapped RAID system 130 still has redundancy, the storage control device 105 will not provide an indication of a warning of replacing the target disk, to avoid bringing extra burden to the management team.

In further embodiments, in response to absence of spare disks in the group of disks, the storage control device 105 may generate an indication of providing a warning of replacing the target disk. In this way, when the group of disks 140 includes a target disk with available time due soon, the storage control device 105 may copy the data in the due target disk using the space of other storage disks. Although the target disk is not marked as failed because it has been swapped out of the mapped RAID system 130, the storage control device 105 generates an indication instructing not to provide the warning of replacing the target disk.

In some embodiments, the storage control device 105 may provide the warning of replacing the target disk with a message forwarding mechanism. Specifically, the storage control device 105, for example, may generate an indication of replacing the target disk and report it to the manager in the form of events. The manager converts the event to a corresponding state and report the state to the system API. The system API may further forward the state to a control path, which determines whether the warning of replacing the target disk is provided according to a predetermined rule. For example, the rule may indicate that the warning of replacing the target disk is provided only when the control path receives a state corresponding to the event of replacing the target disk. In this way, embodiments of the present disclosure may solve the problem that the warning of replacing the target disk is triggered only based on the failure state in the traditional solutions, so as to more accurately and effectively provide the warning of replacing the failed disk.

In some embodiments, in response to an indication of providing the warning of replacing the target disk, the storage control device 105 may provide the warning in real time in the form of emails, phone calls or instant messaging via the control path. If the target disk is not replaced in time, the data in the mapped RAID system 130 may be lost due to the failure of the disks in the attachment. Therefore, the storage control device 105 may provide the warning of replacing the target disk in a way of a higher priority. It should be appreciated the warning of replacing the target disk may be timely provided to the users in any other suitable ways.

In some embodiments, when it is determined at 304 that the target disk is a system disk for storing the configuration data, the process 300 may proceed to 310, at which the storage control device 105 may provide the warning of replacing the target disk. In view of particularity of the data stored in the system disk, the storage control device 105 always provides the warning of replacing the target disk in spite of presence or absence of the spare disk for replacing the system disk, to avoid irreversible risks brought by system configuration information loss. In some embodiments, the storage control device 105 for example may generate an event associated with replacement of system disk and pre-set a rule that the warning is triggered based on the event. In this way, upon receiving a state corresponding to the event, the control path may automatically trigger the warning of replacing the system disk.

Based on the above described method, embodiments of the present disclosure may determine whether an indication of providing the warning of replacing the target disk is generated based on presence or absence of the spare disks in the hardware storage pool and in accordance with whether the type of the target disk to be replaced is a user disk or a system disk. According to the embodiments of the present disclosure, the case where the indication of replacing the target disk is still provided when the warning is unnecessary (for example failed disk has been replaced with the spare disk) and where the indication of replacing the target disk is not timely provided to the users when the warning is required (e.g., failing to swapping the due storage disk out of the RAID) is avoided. Therefore, embodiments of the present disclosure provide a more accurate and effective warning method.

Figure 5:
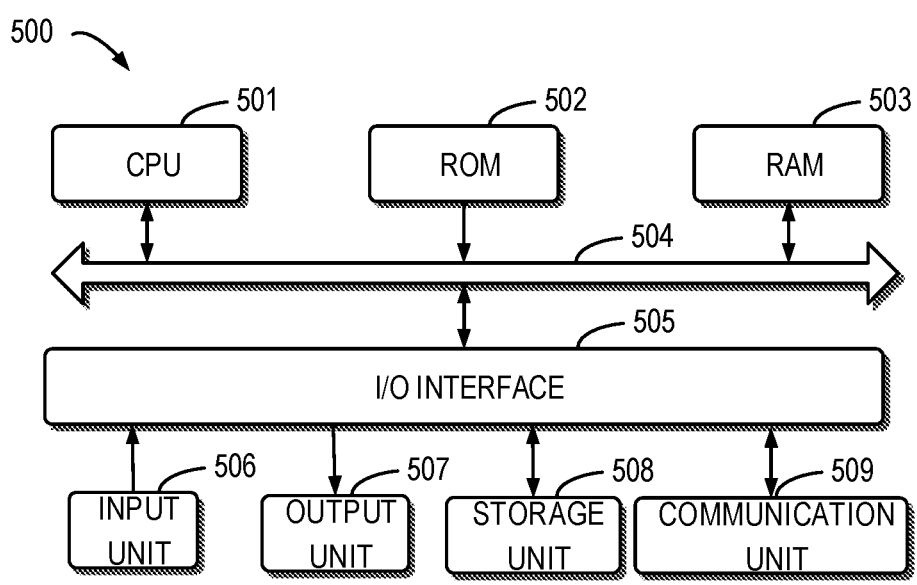
FIG. 5 illustrates a schematic block diagram of an example device for implementing embodiments of the present disclosure.

FIG. 5 shows a schematic block diagram of an example device 500 that can be used to implement embodiments of the present disclosure. For example, the storage control device 105 according to embodiments of the present disclosure can be implemented by device 500. As shown, device 500 includes a central processing unit (CPU) 501 that can perform various appropriate actions according to computer program instructions stored in read only memory (ROM) 502 or loaded from storage unit 508 into a random access memory (RAM) 503. In the RAM 503, various programs and data required for the operation of the device 500 can also be stored. The CPU 501, the ROM 502, and the RAM 503 are connected to each other through a bus 504. An input/output (I/O) interface 505 is also coupled to bus 504.

A plurality of components in device 500 are coupled to I/O interface 505, including: input unit 506, such as a keyboard, mouse, etc.; output unit 507, such as various types of displays, speakers, etc.; storage unit 508, such as a disk and an optical unit, etc.; and a communication unit 509 such as a network card, a modem, a wireless communication transceiver, and the like. Communication unit 509 allows device 500 to exchange information/data with other devices over a computer network such as the Internet and/or various telecommunication networks.

The various processes and processes described above, such as process 300, may be performed by processing unit 501. For example, in some embodiments, process 300 can be implemented as a computer software program that is tangibly embodied in a machine readable medium, such as storage unit 508. In some embodiments, some or the entire computer program may be loaded and/or installed onto device 500 via ROM 502 and/or communication unit 509. One or more actions of process 300 described above may be performed when a computer program is loaded into RAM 503 and executed by CPU 501.

The present disclosure can be a method, device, system and/or computer product. The computer product can include a computer readable storage medium with computer readable program instructions for performing various aspects of the present disclosure thereon.

A computer readable storage medium may be a tangible device that can hold and store the instructions used by the instruction execution device. The computer readable storage medium can be, for example, but not limited to, an electrical storage device, a magnetic storage device, an optical storage device, an electromagnetic storage device, a semiconductor storage device, or any suitable combination of the foregoing. More specific examples (non-exhaustive list) of computer readable storage media include: portable computer disks, hard disks, random access memory (RAM), read only memory (ROM), erasable programmable read only memory (EPROM) or flash memory), static random access memory (SRAM), portable compact disk read only memory (CD-ROM), digital versatile disk (DVD), memory stick, floppy disk, mechanical encoding device, for example, the hole card with instructions stored thereon or raised structure in groove, and any suitable combination of the above. The computer readable storage medium as used herein is not to be interpreted as a transient signal itself, such as a radio wave or other freely propagating electromagnetic wave, an electromagnetic wave propagating through a waveguide or other transfer medium (e.g., a light pulse through a fiber optic cable), or the electrical signal transferred through a wire.

The computer readable program instructions described herein can be downloaded from a computer readable storage medium to various computing/processing devices, or downloaded to an external computer or external storage device over a network, such as the Internet, a local area network, a wide area network, and/or a wireless network. The network may include copper transfer cables, fiber optic transfers, wireless transfers, routers, firewalls, switches, gateway computers, and/or edge servers. A network adapter card or a network interface in each computing/processing device receives computer readable program instructions from the network and forwards the computer readable program instructions for storage in a computer readable storage medium in each computing/processing device.

Computer program instructions for performing the operations of the present disclosure may be assembly instructions, instruction set architecture (ISA) instructions, machine instructions, machine related instructions, microcode, firmware instructions, state setting data, source code or object code written or in any combination of one or more programming languages including object oriented programming languages, such as Smalltalk , C++ and so on, as well as conventional procedural programming languages, such as "C" language or similar programming language. The computer readable program instructions can be executed entirely on the user's computer, partly on the user's computer, as a stand-alone software package, partly on the user's computer and partly on the remote computer, or entirely on the remote computer or server. In the case of a remote computer, the remote computer can be connected to the user's computer through any kind of network, including a local area network (LAN) or wide area network (WAN), or can be connected to an external computer (e.g., using an Internet service provider to access the Internet connection). In some embodiments, the customized electronic circuit, such as a programmable logic circuit, a field programmable gate array (FPGA), or a programmable logic array (PLA), can be customized by utilizing state information of computer readable program instructions. The electronic circuit can execute computer readable program instructions to implement various aspects of the present disclosure.

Various aspects of the disclosure are described herein with reference to flowcharts and/or block diagrams of methods, devices (systems) and computer products according to embodiments of the present disclosure. It will be understood that each block of the flowchart illustrations and/or block diagrams, and combinations of blocks in the flowcharts and/or block diagrams can be implemented by computer readable program instructions.

These computer readable program instructions can be provided to a processing unit of a general purpose computer, a special purpose computer or other programmable data processing apparatus to produce a machine such that when the instructions are executed by processing unit via a computer or other programmable data processing apparatus, devices that implement the functions/acts specified in one or more of the flowcharts and/or block diagrams are produced. The computer readable program instructions can also be stored in a computer readable storage medium that causes the computer, programmable data processing device, and/or other device to operate in a particular manner, such that the computer readable medium storing the instructions includes an article of manufacture that includes instructions for implementing various aspects of the functions/acts recited in one or more blocks of the flowcharts and/or block diagrams.

Computer readable program instructions can also be loaded onto a computer, other programmable data processing device, or other device to perform a series of operational steps on a computer, other programmable data processing device or other device to produce a process that a computer is implemented such that instructions executed on a computer, other programmable data processing apparatus, or other device implement the functions/acts recited in one or more of the flowcharts and/or block diagrams.

The flowchart and block diagrams in the drawings illustrate the architecture, functionality, and operation of possible implementations of devices, methods, and computer products according to various embodiments of the present disclosure. In this regard, each block in the flowchart or block diagram can represent a module, a program segment, or a portion of an instruction, module, the program segment, or a portion of the instruction includes one or more executable instructions for implementing principles. In some alternative implementations, the functions noted in the blocks may also occur in a different order than those illustrated in the drawings. For example, two consecutive blocks may be executed substantially in parallel, and they may sometimes be executed in a reverse order, depending upon the functionality involved. It is also noted that each block of the block diagrams and/or flowcharts, and combinations of blocks in the block diagrams and/or flowcharts, can be implemented in a dedicated hardware-based system that performs the specified function or action of principle or can be implemented with a combination of dedicated hardware and computer instructions.

The embodiments of the present disclosure have been described above, and the foregoing description is illustrative, not limiting, and not limited to the disclosed embodiments. Numerous modifications and changes will be apparent to those skilled in the art without departing from the scope of the invention. The choice of terms used herein is intended to best explain the principles, practical applications, or technical improvements of the techniques on the market, or enable other ordinary technical staffs in the art to understand the embodiments in the disclosure.

We claim:

1. A method for disk management, comprising:
    in accordance with a determination that a target disk in a set of disks is to be replaced, determining whether the target disk is a user disk for storing user data;
    in response to the target disk being the user disk, searching for a spare disk in the set of disks available for replacing the target disk; and
    in accordance with a determination whether the set of disks include a spare disk available for replacing the target disk, generating an indication of whether or not to provide a warning of replacing the target disk.

2. The method of claim 1, wherein searching for a spare disk in the set of disks available for replacing the target disk comprises:
    in response to presence of a free disk in the set of disks, obtaining a healthy parameter associated with the free disk; and
    in response to the healthy parameter indicating that a healthy level of the free disk is higher than a predetermined threshold, determining the free disk as the spare disk.

3. The method of claim 1, wherein generating an indication of whether or not to provide a warning of replacing the target disk comprises:
    in response to presence of the spare disk in the set of disks, generating an indication of not providing a warning of replacing the target disk; and
    in response to absence of the spare disk in the set of disks, generating an indication of providing a warning of replacing the target disk.

4. The method of claim 1, further comprising:
    in response to the target disk being a system disk for storing configuration data, providing a warning of replacing the target disk.

5. The method of claim 1, further comprising:
    in response to an indication of providing a warning of replacing the target disk, providing the warning in real time through at least one of:
        an email,
        a phone call, or
        instant messaging.

6. The method of claim 1, further comprising:
    in response to determining that the target disk is failed, rebuilding data of the target disk in an available space of the set of disks; and
    determining that the target disk is to be replaced.

7. The method of claim 1, further comprising:
    in response to determining that a residual life of the target disk is less than a predetermined threshold, duplicating data of the target disk to an available space of the set of disks; and
    determining that the target disk is to be replaced.

8. An electronic device, comprising:
    at least one processing unit;
    at least one memory coupled to the at least one processing unit and storing instructions executable by the at least one processing unit, the instructions, when executed by the at least one processing unit, causing the device to perform acts comprising:
        in accordance with a determination that a target disk in a set of disks is to be replaced, determining whether the target disk is a user disk for storing user data;
        in response to the target disk being the user disk, searching for a spare disk in the set of disks available for replacing the target disk; and
        in accordance with a determination whether the set of disks include a spare disk available for replacing the target disk, generating an indication of whether or not to provide a warning of replacing the target disk.

9. The device of claim 8, wherein searching for a spare disk in the set of disks available for replacing the target disk comprises:
    in response to presence of a free disk in the set of disks, obtaining a healthy parameter associated with the free disk; and
    in response to the healthy parameter indicating that a healthy level of the free disk is higher than a predetermined threshold, determining the free disk as the spare disk.

10. The device of claim 8, wherein generating an indication of whether or not to provide a warning of replacing the target disk comprises:
    in response to presence of the spare disk in the set of disks, generating an indication of not providing a warning of replacing the target disk; and
    in response to absence of the spare disk in the set of disks, generating an indication of providing a warning of replacing the target disk.

11. The device of claim 8, wherein the acts further include:
    in response to the target disk being a system disk for storing configuration data, providing a warning of replacing the target disk.

12. The device of claim 8, wherein the acts further include:
    in response to an indication of providing a warning of replacing the target disk, providing the warning in real time through at least one of:
        an email,
        a phone call, or
        instant messaging.

13. The device of claim 8, wherein the acts further comprise:
    in response to determining that the target disk is failed, rebuilding data of the target disk in an available space of the set of disks; and
    determining that the target disk is to be replaced.

14. The device of claim 8, wherein the acts further comprise:
- in response to determining that a residual life of the target disk is less than a predetermined threshold, duplicating data of the target disk to an available space of the set of disks; and
- determining that the target disk is to be replaced.

15. A computer program product having a non-transitory computer readable medium which stores a set of instructions to perform disk management; the set of instructions, when carried out by computerized circuitry, causing the computerized circuitry to perform a method of:
- in accordance with a determination that a target disk in a set of disks is to be replaced, determining whether the target disk is a user disk for storing user data;
- in response to the target disk being the user disk, searching for a spare disk in the set of disks available for replacing the target disk; and
- in accordance with a determination whether the set of disks include a spare disk available for replacing the target disk, generating an indication of whether to provide a warning of replacing the target disk.

16. The computer program product of claim 15, wherein the indication of whether to provide the warning indicates that a warning is to be provided, and wherein the method further includes:
- in response to the indication of whether to provide the warning indicating that the warning is to be provided, providing the warning in real time through at least one of:
- an email,
- a phone call, or
- instant messaging.

17. The computer program product of claim 16, wherein providing the warning in real time includes:
- automatically sending an email, automatically providing a phone call, and automatically transmitting text via instant messaging to output the warning through multiple different paths.

* * * * *